(12) United States Patent
Quijano et al.

(10) Patent No.: US 7,593,219 B2
(45) Date of Patent: Sep. 22, 2009

(54) DISPLAY SUPPORT SYSTEM AND METHOD

(75) Inventors: David Quijano, Magnolia, TX (US); Randall W. Martin, The Woodlands, TX (US); John E. Youens, Magnolia, TX (US); Cynthia J. Purvis, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 228 days.

(21) Appl. No.: 11/789,988

(22) Filed: Apr. 26, 2007

(65) Prior Publication Data

US 2008/0266486 A1  Oct. 30, 2008

(51) Int. Cl.
    *H05K 7/12* (2006.01)
(52) U.S. Cl. ............... 361/679.22; 248/923; 349/60
(58) Field of Classification Search ............ 361/681, 361/682, 679.22; 248/923; 349/60
    See application file for complete search history.

(56) References Cited

U.S. PATENT DOCUMENTS

| | | | |
|---|---|---|---|
| 4,836,478 A | 6/1989 | Sweere | |
| 5,630,566 A | 5/1997 | Case | |
| 5,738,316 A | 4/1998 | Sweere et al. | |
| 5,826,846 A | 10/1998 | Buccieri et al. | |
| 5,876,008 A | 3/1999 | Sweere et al. | |
| 5,947,429 A | 9/1999 | Sweere et al. | |
| 6,015,120 A | 1/2000 | Sweere et al. | |
| 6,019,332 A | 2/2000 | Sweere et al. | |
| D423,745 S | 4/2000 | Theis et al. | |
| 6,108,195 A * | 8/2000 | Behl et al. | 361/681 |
| 6,189,849 B1 | 2/2001 | Sweere et al. | |
| 6,208,505 B1 * | 3/2001 | Kuchta et al. | 361/683 |
| 6,419,196 B1 | 7/2002 | Sweere et al. | |
| 6,464,195 B1 | 10/2002 | Hildebrandt | |
| 6,478,274 B1 | 11/2002 | Oddsen, Jr. | |
| 6,484,993 B2 | 11/2002 | Huffman | |
| 6,554,238 B1 | 4/2003 | Hibberd | |
| D477,325 S | 7/2003 | Theis et al. | |
| D477,606 S | 7/2003 | Theis et al. | |
| 6,783,105 B2 | 8/2004 | Oddsen | |
| 6,987,666 B2 * | 1/2006 | Medica et al. | 361/681 |
| 6,997,422 B2 | 2/2006 | Sweere et al. | |
| 7,063,294 B2 | 6/2006 | Miller | |
| 7,068,497 B2 | 6/2006 | Chu | |
| 7,091,961 B2 | 8/2006 | Ditzik | |
| 2003/0001057 A1 | 1/2003 | Sweere et al. | |
| 2005/0006542 A1 | 1/2005 | Henning et al. | |
| 2005/0029208 A1 | 2/2005 | Paiste et al. | |
| 2005/0061931 A1 | 3/2005 | Oddsen, Jr. et al. | |
| 2005/0081412 A1 | 4/2005 | Malkovas | |

(Continued)

OTHER PUBLICATIONS

Wikipedia, Image: IMac.jpg, located at: http://en.wikipedia.org/wiki/Image:IMac.jpg.

(Continued)

*Primary Examiner*—Jayprakash N Gandhi
*Assistant Examiner*—Ingrid Wright

(57) ABSTRACT

Embodiments of the present invention are directed to a display support system and method. In one embodiment, the display support system and method comprises a base configured to be placed underneath a computer, a neck projecting from the base, a top bracket extending from the neck, and a display connector disposed along the top bracket, the display connector configured to couple with a display feature.

21 Claims, 7 Drawing Sheets

U.S. PATENT DOCUMENTS

| | | |
|---|---|---|
| 2005/0228257 A1 | 10/2005 | Ishikawa et al. |
| 2006/0145043 A1 | 7/2006 | Liou et al. |
| 2006/0231710 A1 | 10/2006 | Huang |
| 2006/0284037 A1 | 12/2006 | Dittmer et al. |

OTHER PUBLICATIONS

Dell, Monitor Stand for Dell Precision M90 Mobile WorkStation found at: http://accessories.us.dell.com/sna/productdetail.aspx?sku=310-8113&cs=19&c=us&1=en.

ErgoWorks Flat Screen Monitor Arm, found at: http://www.askergoworks.com/shopdisplayproducts.asp?id=4&subcat=36&cat32 Monitor+Arms.

Ergotron 28-512-195 LX Dual Desk Mount Arm for LCD and Notebook, located at: http://www.ergotron.com/ProfessionalProducts/tabid/65/ctl/Product/mid/387/PRDID/134/language/en-US/default.aspx.

Ergotron 45-192-195 LX Desk Mount Notebook/Laptop Arm, located at: http://www.ergotron.com/ProfessionalProducts/tabid/65/ctl/Product/mid/387/PRDID/69/language/en-US/default.aspx.

Ergotron LX Desk Mount Notebook Arm, located at: http://www.ergotron.com/ProfessionalProducts/tabid/65/Default.aspx?FID=42,46,49.

Ergotron LX Desk Mount LCD Arm and 200 Series Desk Mount Arm, located at http://www.ergotron.com/ProfessionalProducts/tabid/65/Default.aspx?FID-42,46,47.

Ergotron 45-179-195 LX Desk Mount LCD Arm, located at: http://www.ergotron.com/ProfessionalProducts/tabi d/65/ctl/Product/mid/387/PRDID/11/language/en-US/default.aspx.

Ergotron 28-097-200 200 Series Desk Mount LCD Monitor Arm, located at http://www.ergotron.com/ProfessionalProducts/tabid/65/ctl/Product/mid/387/PRDID/89/language/en-US/default.aspx.

ErgoStoreOnline, Ergonomic Monitor Arm, located at: http://www.ergostoreonline.com/monitor_arms_lifts.html.

Ergotron easyChoose tool, located at: http://internalapps.ergotron.com/aspfordnn/easychoose/notebook1.asp.

* cited by examiner

DISPLAY SUPPORT SYSTEM AND METHOD

BACKGROUND

This section is intended to introduce the reader to various aspects of art, which may be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

Computer systems generally include a computer unit that communicatively couples with a variety of peripheral components. The computer unit may include a desktop or portable computer. While portable computers (e.g., laptops) typically include peripheral components that are integrated therein, separate peripheral components are also frequently utilized with portable computers to improve functionality. For example, although a portable computer may include an integral display, the portable computer may be coupled to a separate display to improve visual accessibility. Indeed various accessories may be communicatively coupled to either a portable computer or a desktop computer to improve or add functionality. Typical peripheral components may include a mouse, a printer, a display, speakers, and so forth.

Regardless of the type of computer system (e.g., desktop or portable), a significant amount of workspace is typically consumed due to conventional positioning of computer system components. For example, displays or monitors typically have a large footprint, which generally increases with the viewable area of the display. Due to such space limitations, the computer components may be arranged awkwardly to fit in an allotted space. This can create issues relating to accessing or adjusting computer features (e.g., cables, component positions, and internal computer components). Further, for many users, the display screen, the keyboard, and other features may be difficult or inconvenient to use because of their relative positioning. Indeed, accessing certain computer system components in traditional orientations may have a negative impact on the musculoskeletal and visual comfort of a user. For example, the viewing angle of a computer display and its relative position to a keyboard may have a negative ergonomic effect on the user because the user may be required to assume a strenuous body position in order to view the display.

DETAILED DESCRIPTION OF SPECIFIC EMBODIMENTS

One or more exemplary embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
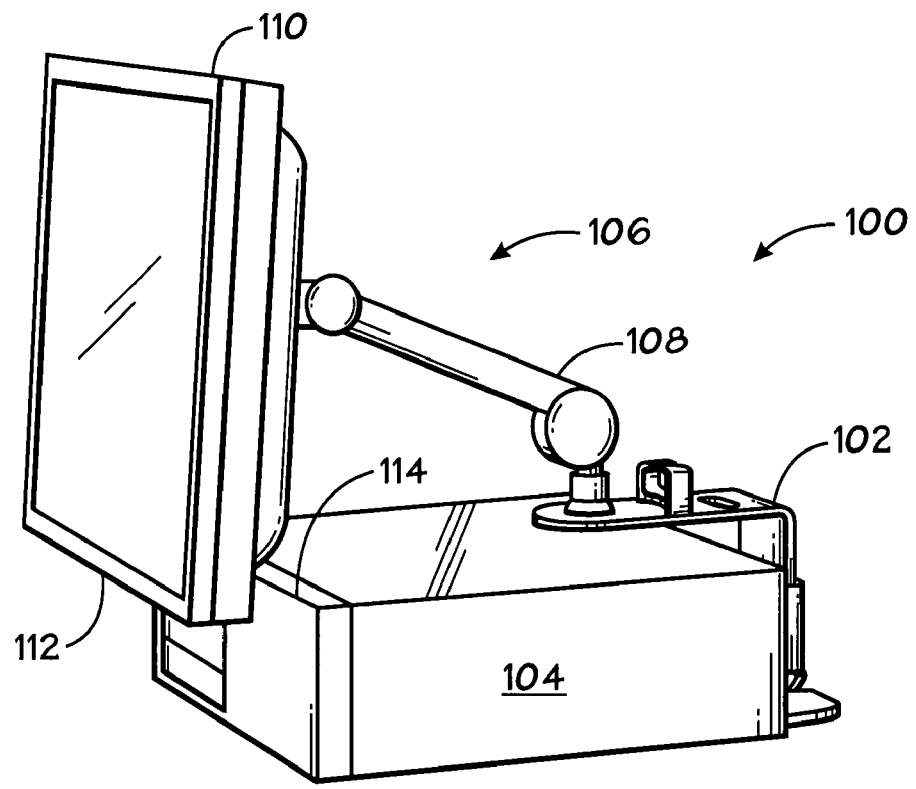
FIG. 1 is a perspective view of a computer system in accordance with an exemplary embodiment of the present invention.

Embodiments of the present invention are directed to a display management system or display support mechanism that may be configured to conserve area in a workspace, facilitate convenient positioning of computer system components, and facilitate implementation of ergonomic adjustments to the computer system. In one embodiment, as illustrated in FIG. 1, a computer system 100 includes a display stand or display support mechanism 102 configured to receive a computer 104. Additionally, as illustrated in FIG. 1, the display stand 102 is configured to couple to a display feature 106 such that the display feature 106 extends from a location above the computer 104. The display feature 106 may include a display arm 108 (e.g., an adjustable, elongate, positioning mechanism) configured to couple to a display 110 and to a base, such as the display stand 102. In other embodiments, the display feature 106 may include both the display arm 108 and the display 110.

In certain embodiments, the display feature 106 supports the display 110 in a cantilevered manner over and beyond a computer, a keyboard, or a combination thereof. In this manner, the display 110 is positioned closer to a user, such that the user can more clearly see the display 100 while the other components remain out of the way. Present embodiments may conserve limited workspace by facilitating placement of the display feature 106 over at least a portion of the computer 104 (e.g., a portable computer or a desktop computer), thus, causing the display feature 106 and the computer 104 to have completely or partially overlapping footprints. In other words, present embodiments may include a display support mechanism 102 that facilitates space conservation by supporting the display feature 106 from above the computer 104. Further, present embodiments may conserve space and improve component mobility by utilizing the computer 104 for support. Indeed, while traditional display support mechanisms often couple to a work surface (e.g., a desk top or a wall) for reinforcement, present embodiments may couple to the computer 104 for reinforcement. By coupling the display support mechanism 102 to the computer 104 instead of coupling it to a portion of the work surface, present embodiments conserve workspace that would otherwise be utilized for such attachment. Also, by coupling the display support mechanism 102 to the computer 104, present embodiments facilitate maneuverability of the display 110 and the entire computer system 100 because movement is not limited by attachment to a fixed surface. Additionally, present embodiments may facilitate implementation of ergonomic adjustments to the system 100 by enabling a user to adjustably position the display 110 in orientations that may be unavailable in traditional arrangements, such as positioning a base portion 112 of the display 110 beneath a top portion 114 of the computer 104.

Figure 2:
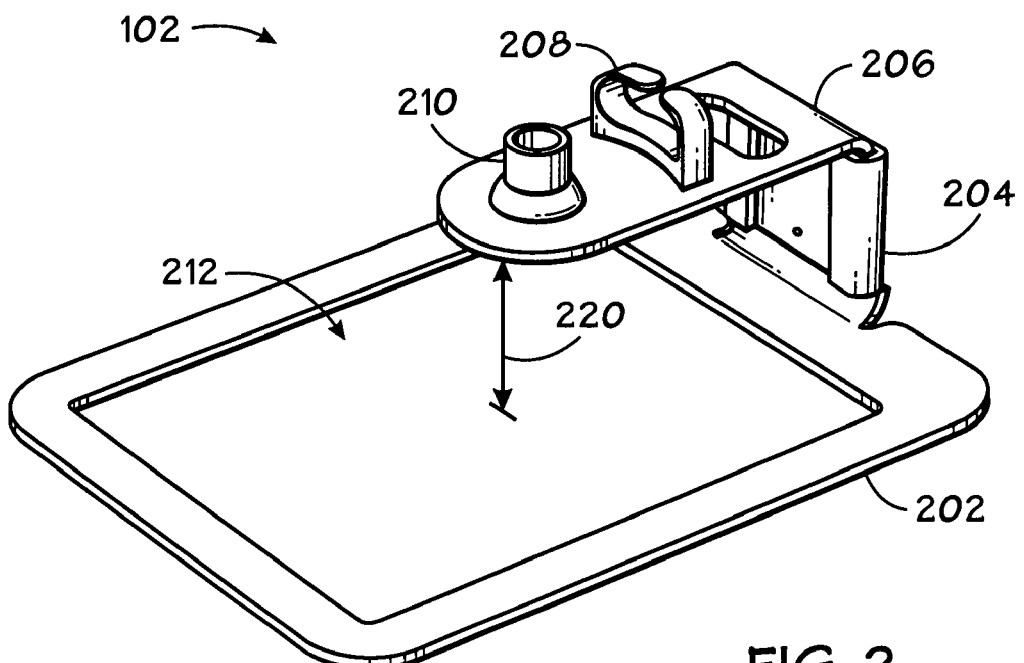
FIG. 2 is a perspective view of a display support mechanism in accordance with an exemplary embodiment of the present invention.
Figure 3:
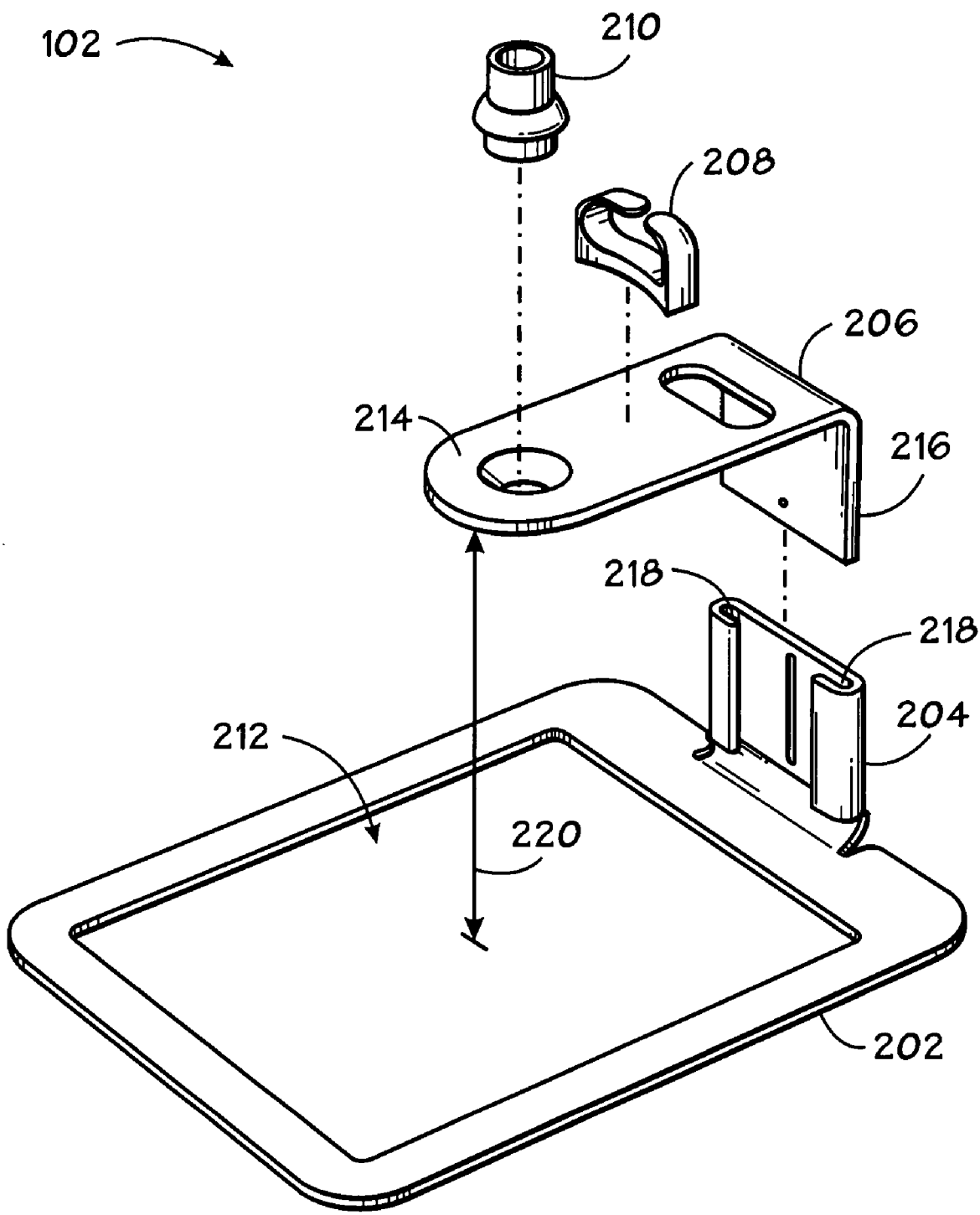
FIG. 3 is an exploded perspective view of a display support mechanism in accordance with an exemplary embodiment of the present invention.

FIG. 2 is a perspective view of the display support mechanism 102 in accordance with an exemplary embodiment of the present invention. In the illustrated embodiment, the display support mechanism 102 includes a base 202, a neck 204, a top bracket 206, a cable clip 208, and a display connector 210. These features are also illustrated in FIG. 3, which is an exploded perspective view of the display support mechanism 102. The features of the display support mechanism 102 may be constructed or formed from any of a variety of materials (e.g., plastic, aluminum, steel, or combinations thereof).

In the illustrated embodiment of FIG. 2, the base 202 includes a generally planar component. The base 202 may be configured to slide underneath the computer 104 and/or configured to facilitate positioning of the display support mechanism 102 about the computer 104. In some embodiments, the base 202 may be sized or configured to hold the display support mechanism 102 in an upright orientation without being coupled to the computer 104. That is, the display support mechanism 102 may be able to stand alone because the base 202 is configured to provide a sufficiently stable underpinning. Indeed, in some embodiments, the display support mechanism 102 may be configured to support itself and the display feature 106 without being coupled to the computer 104. This may facilitate moving or accessing the computer 104 without having to move or readjust the display feature 106. For example, a user may remove the computer 104 from the display support mechanism 102 for servicing and replace it without changing the positioning of the display arm 108, which may be specifically oriented to a particular user's preference.

In some embodiments, the display support mechanism 102 may be configured to utilize attachment to the computer 104, instead of the base 202, to provide support. For example, the base 202 may be substantially minimally sized to facilitate coupling the display support mechanism 102 to the computer 104 between the base 202 and the top bracket 206 while conserving manufacturing material. In such embodiments, utilizing the base 202 and the top bracket 206 to couple with the computer 104 provides sufficient support to hold the display support mechanism 102 and/or the display feature 106 in a desired orientation. For example, the weight of the computer 104 may counterbalance the weight of the display feature 106 when the display feature 106 is extended in a cantilevered position. It should be noted that the base may include a cavity 212 that conserves material and facilitates manufacture of the base 202 from a single sheet of material.

As illustrated in FIG. 2, the neck 204 includes a vertical extension from the base 202. The neck 204 may extend in a direction that is substantially perpendicular (e.g., perpendicular or near perpendicular) to the base, as illustrated in FIG. 2. Further, the neck 204 may be integral with or configured to couple to the base 202. Similarly, the neck 204 may be integral with or configured to couple to the top bracket 206. The top bracket 206 may be defined as a structural support with at least a portion of the top bracket 206 projecting from the neck 204 in a direction substantially parallel (e.g., parallel or near parallel) to the base 202. The top bracket 206 may be configured to couple with and/or adjustably retain the display feature 106. For example, the display feature 106 may be removably fastened to the top bracket 206 via the display connector 210, which may be defined as a mechanical device that serves to connect portions of adjacent objects (e.g., the top bracket 206 and the display feature 106). The display connector 210 may retain the display feature 106 while still enabling rotation of the display feature 106 into various different positions. It should be noted that the top bracket 206 may also include or couple with the cable clip 208 to facilitate connection and organization of cables extending from the display 110 and/or other peripheral devices. For example, the cable clip 208 may receive and guide cables from the display feature 106 along a defined path.

As illustrated in FIG. 3, the top bracket 206 may be configured to slidably or adjustably couple with the neck 204. For example, the top bracket 206 may include a horizontal projection 214 and a vertical projection 216 such that the bracket has a substantially L-shaped cross-section. The vertical projection 216 may adjustably or slidably engage grooves or receptacles 218 of the neck 204 to facilitate adjustment of the display support mechanism 102 for computers of different sizes. That is, the vertical projection 216 cooperates with the neck 204 to define a height adjustable or telescopic neck that can be reconfigured for computers of different sizes. For example, a distance 220 between the base 202 and the top bracket 206 may be adjustable to accommodate computers of different thicknesses, as illustrated in FIGS. 4 and 5.

Figure 4:
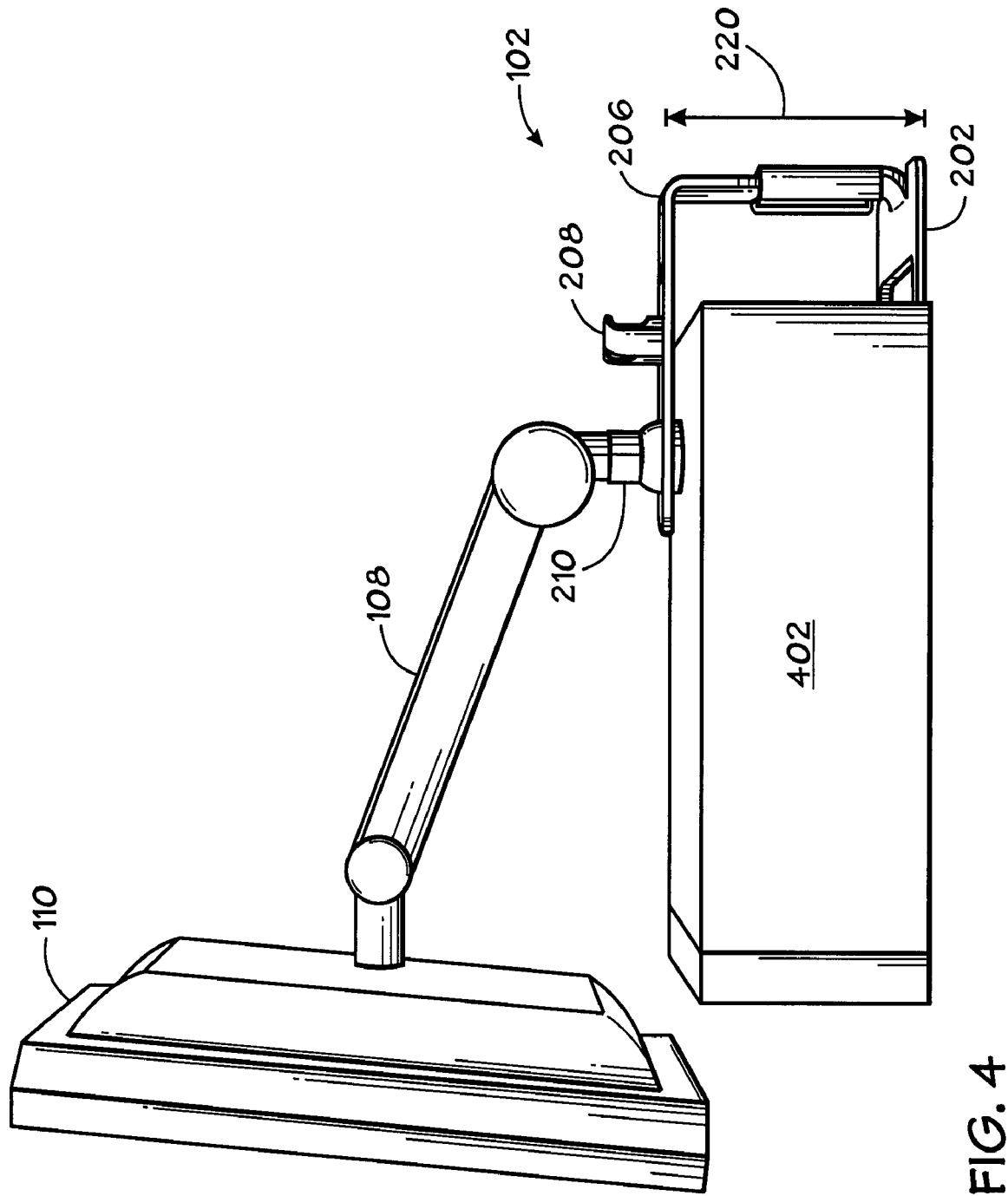
FIG. 4 is a side view of a thick computer coupled to a display support mechanism in accordance with an exemplary embodiment of the present invention.
Figure 5:
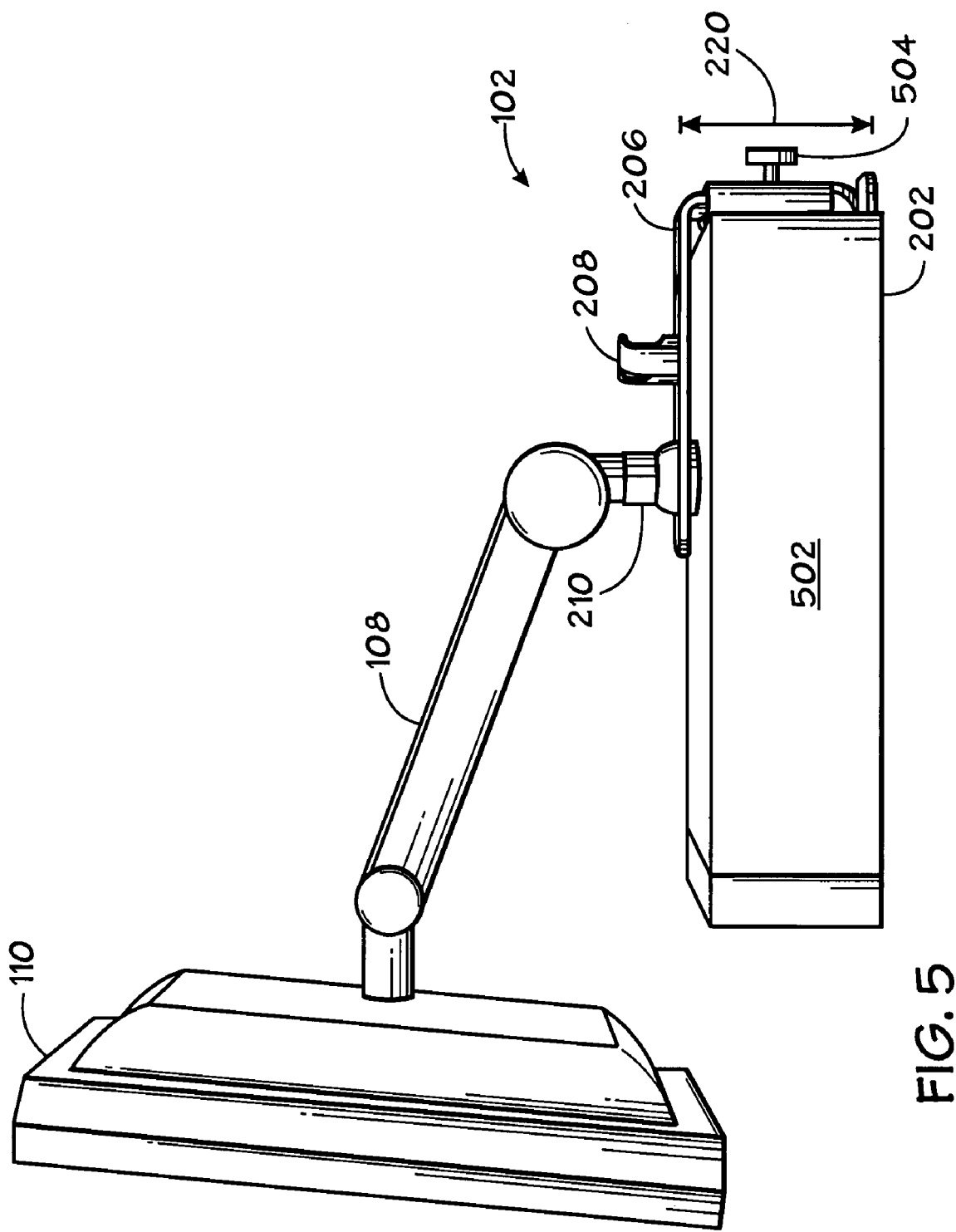
FIG. 5 is a side view of a thin computer coupled to a display support mechanism in accordance with an exemplary embodiment of the present invention.

Specifically, for example, FIG. 4 illustrates the display support mechanism 102 being coupled to a thick desktop computer 402, and FIG. 5 illustrates the display support mechanism 102 being coupled to a thin desktop (or laptop) computer 502. In FIG. 4, the distance 220 has been increased relative to FIG. 5 by sliding the top bracket 206 away from the base 202 so that the display support mechanism 102 can receive the thick desktop computer 402. Similarly, in FIG. 5, the distance 220 has been decreased relative to FIG. 4 to secure the display support mechanism 102 about the thin desktop computer 502. As illustrated in FIG. 5, some embodiments may include a fastener 504. The fastener 504 may be configured to hold the base 202 and the top bracket 206 in substantially fixed orientations relative to one another, thus, facilitating a secure coupling of the display support mechanism 102 to the computer (e.g., the thin desktop computer 502). For example, the fastener 504 may include a screw and nut pair that bias the neck 204 and the vertical projection 216 together when tightened, thus, resisting relative movement of the base 202 and the top bracket 206.

It should be noted that computers may be fully or partially inserted into the display support mechanism 102. For example, as illustrated in FIG. 4, the thick computer 404 is partially inserted into the display support mechanism 102 such that the display connector 210 is arranged adjacent a rear portion of the thick computer 404 and the rear portion does not abut the neck 204 of the display support mechanism 102. However, in other embodiments, computers may be fully inserted such that they abut the neck 204 of the display support mechanism 102. For example, as illustrated in FIG. 5, the thin computer 502 is fully inserted into the display support mechanism 102 such that a rear portion of the thin computer 502 abuts the neck 204 and such that the display connector 210 is more centrally located over the thin computer 502. It may be desirable to adjust the extent of insertion of a computer into the display support mechanism 102 to control the positioning range of the display arm 108. Also, as illustrated in FIGS. 4 and 5, the display arm 108 may include various features that enable adjustment or positioning of the display 110. For example, the display arm 108 may include pivots, hinges, extension mechanisms, and so forth that enable a user to readily maneuver the display 110 into a desired orientation. Indeed, in accordance with present embodiments, the display feature 106 may include height, tilt, swivel, and pivot functionalities.

Present embodiments may increase accessibility to system components and facilitate ergonomic adjustment of certain system features (e.g., the display 110). Some traditional display stands limit positioning of displays to ergonomically undesirable heights. For example, when a display is simply placed on a shelf that is disposed over a computer, the display generally cannot be adjusted to a height below the shelf. This can cause muscle fatigue in the neck and upper back of a user because they must hold certain uncomfortable positions to properly view the display. This can especially be a problem for bifocal and progressive lens users because they may have to tilt their heads back to see the display 110 through the lower portions of their eyeglasses. However, present embodiments allow users to place the display 110 in various positions to facilitate ergonomic viewing. For example, the display arm 108 may extend over the edges of the computer 104 and facilitate positioning the display adjacent a work surface or such that at least a portion of the display is lower than a portion of the computer 104. This may allow a user, such as a bifocal user, to properly view the display 110 without holding his or her head at an uncomfortable angle.

Figure 6:
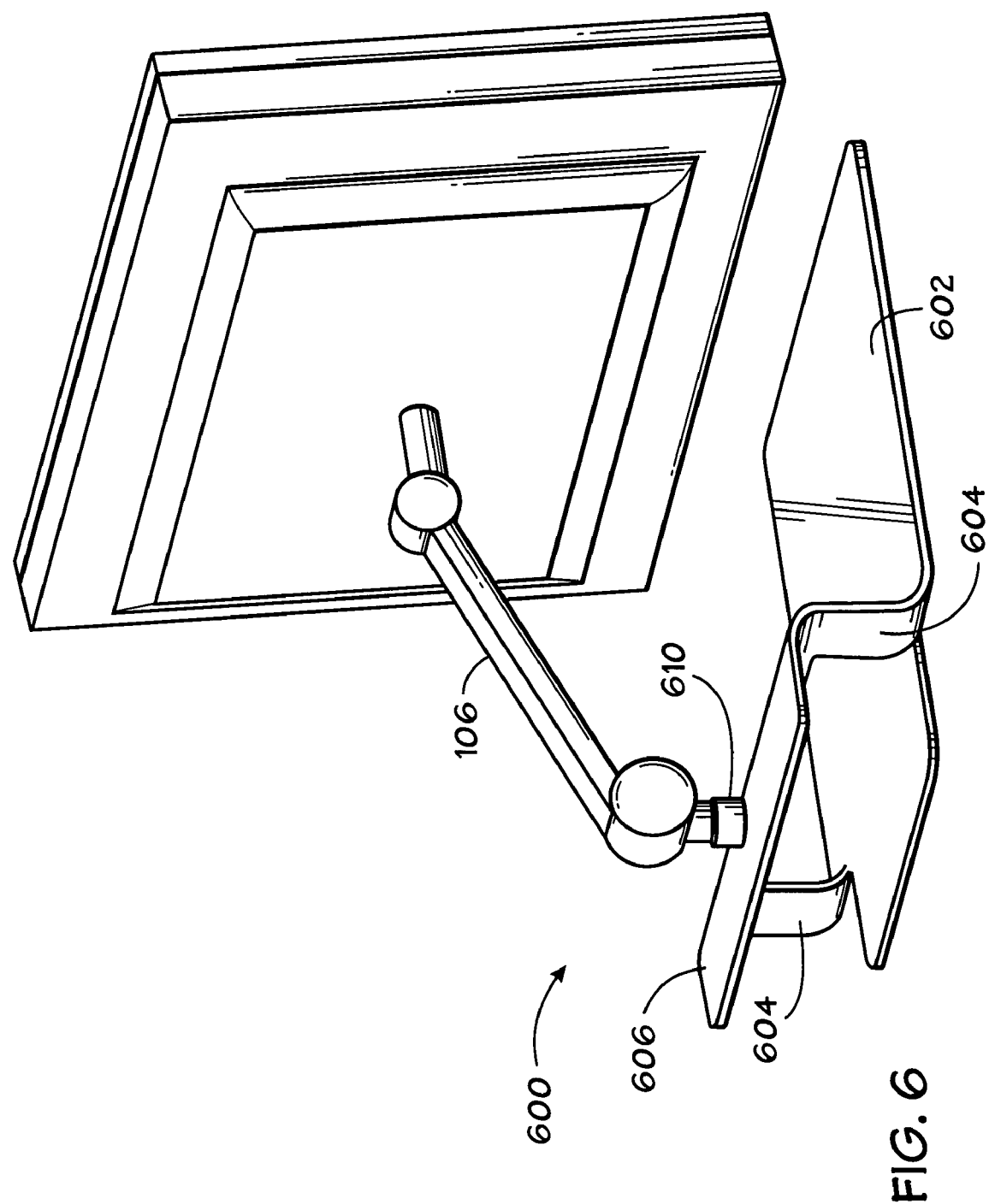
FIG. 6 is a perspective view of a display support mechanism coupled to a display feature in accordance with an exemplary embodiment of the present invention.

FIG. 6 is a perspective view of another display support mechanism in accordance with an exemplary embodiment of the present invention. The display support mechanism illustrated in FIG. 6 is generally indicated by reference numeral 600 and is coupled to the display arm 108 and the display 110. The display support mechanism 600 includes a base 602, a pair of necks 604, a top bracket 606, and a display connector 610. In the illustrated embodiment, these features of the display support mechanism 600 are integrated together into a single unit. Indeed, the base 602, the pair of necks 604, and the top bracket 606 are formed from a single sheet of material (e.g., a sheet of plastic or metal) and the display connector 610 is coupled thereto. Using a single sheet of material to form features of the display support mechanism 602 may facilitate conservation of costly manufacturing materials and improve structural characteristics (e.g., tensile strength) of the display support mechanism 602 by eliminating potentially weak couplings and so forth.

Figure 7:
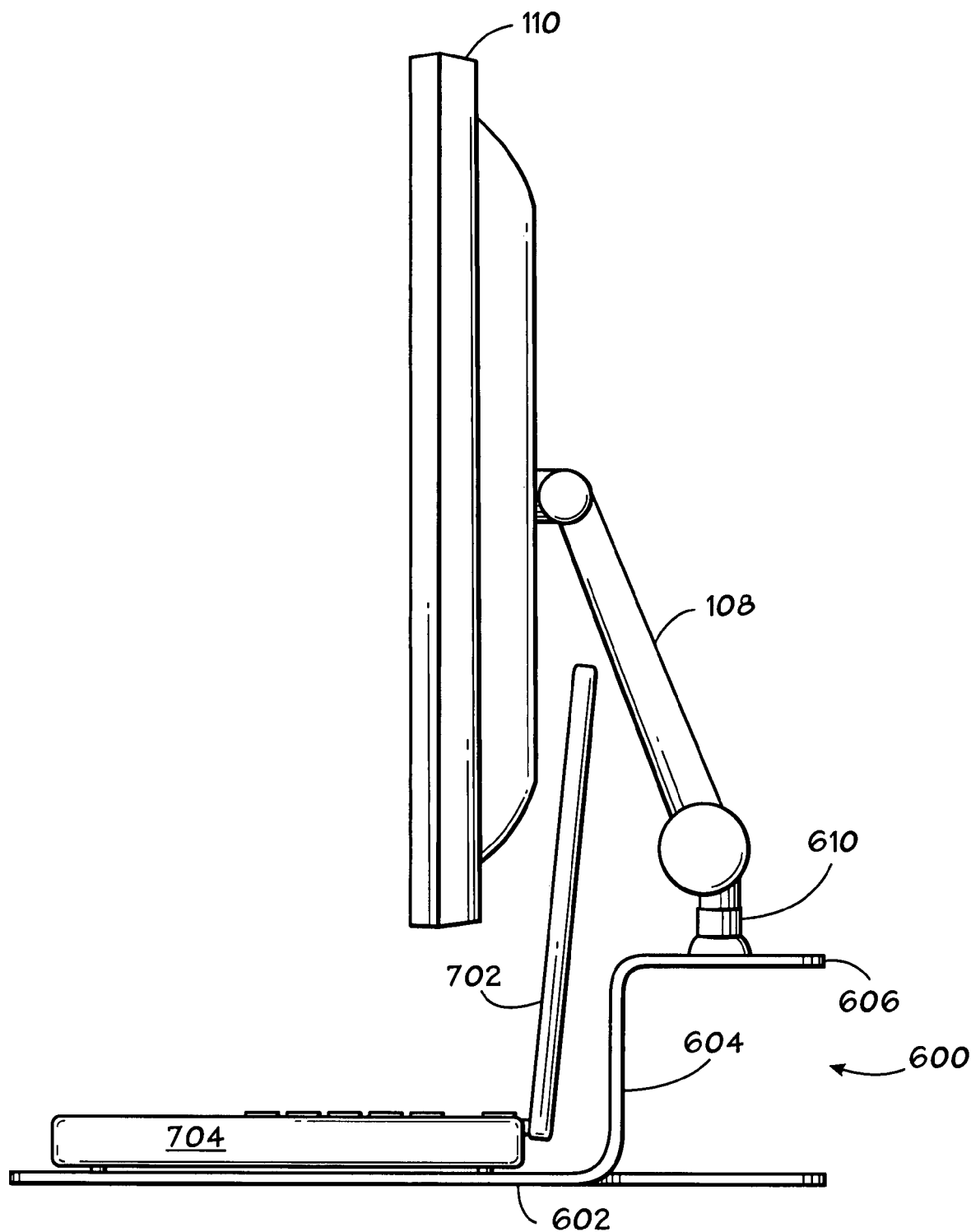
FIG. 7 is side view of a display support mechanism coupled to a display feature and coupled to a portable computer in an open configuration in accordance with an exemplary embodiment of the present invention.

The display support mechanism 600 illustrated in FIG. 6 may be configured to cooperate with a portable computer and/or a desktop computer. However, use of the display support mechanism 600 with a portable computer may be particularly desirable for various reasons. For example, the display support mechanism 600 may be utilized instead of a traditional docking station used for portable computers, and the display support mechanism 600 maybe be cheaper and consume less workspace than such a docking station. Additionally, the arrangement of the features of the display support mechanism 600 may facilitate rapid insertion and removal of the computer from the display support mechanism 600. Indeed, in the illustrated embodiment of FIG. 6, the pair of necks 604 and top bracket 606 are fixed in positions relative to the base 602 and the top bracket 606 does not extend over the area configured to receive the computer, which makes the display support mechanism 600 very accessible for the frequent insertions and removals associated with use of a portable computer. Further, as illustrated in FIG. 7, not only does the display support mechanism 600 facilitate ergonomic adjustments of the display 110, it may enable adjustment of the display arm 108 such that the display 110 is positioned above an integral display 702 of a portable computer 704 to facilitate utilization of both displays 110 and 702 together. Further, while the embodiment illustrated in FIG. 7 includes the display 110 positioned above the integral display 702, different orientations may be employed in other embodiments. For example, the display 110 may be positioned to the side of the integral display 702.

It should be noted that some embodiments of the present invention may include a security feature that may resist unauthorized tampering or movement of the computer 104 when it is coupled to the display support mechanism 102. For example, present embodiments may include a device that couples both the base 202 and the top bracket 206 directly to a work surface (e.g., a desk top). Once the device is in place, it may be locked such that a key or combination is required to release it. By coupling both the base 202 and the top bracket 206 to the work surface, the computer 104 is securely sandwiched or wedged into place. Such a device may employ various locking mechanisms and cooperate with other security features (e.g., a Kensington® lock available from Kensington Technology Group, which is located in Redwood Shores, Calif.) to provide additional security.

Figure 8:
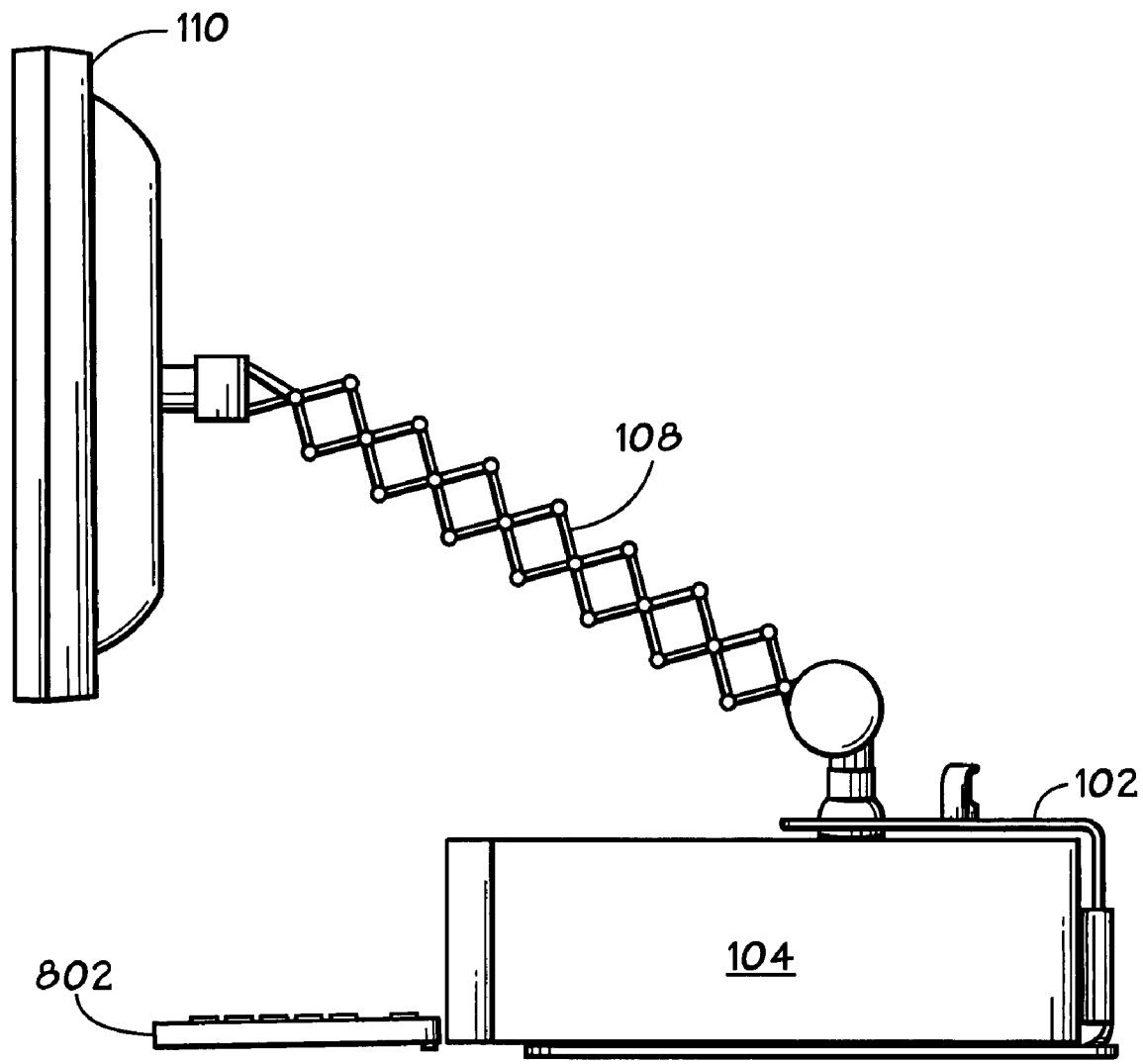
FIG. 8 is a side view of a display support mechanism supporting a display in a cantilevered position in front of a keyboard in accordance with an exemplary embodiment of the present invention.

FIG. 8 is a side view of the display support mechanism 102 and the display arm 108 supporting the display 110 in a cantilevered position in front of a keyboard 802 in accordance with an exemplary embodiment of the present invention. The display arm 108 and/or the display support mechanism 102 may include adjustable features that facilitate positioning the display in various positions relative to the keyboard 802 and the computer 104. For example, the display 110 may be positioned over the keyboard 802 so that the display 110 is closer to the user's face than the keyboard 802, which allows the user to lean back while using the keyboard 802 and the display 110. By enabling such positioning of the display 110 with respect to the keyboard 802, present embodiments facilitate ergonomic use of the display 110 and keyboard 802. Indeed, the display feature 106 and/or the display support mechanism 102 may be configured such that users can sit in upright postures (e.g., approximately 90 degrees between the user's lap and back) or reclined postures (e.g., 110 degrees between the user's lap and back) and place a center of the display's viewable area at a viewing angle between −15 degrees to −25 degrees below their line of sight. Further, the display 110 may be positioned with variable viewing distances (e.g., 16 to 18 inches) between the screen and the user's eyes. The adjustability of the display feature 106 and/or display support mechanism 102 may facilitate such positioning for users (e.g., children and adults) that are sized within the 5th to the 95th percentile of all typical users.

What is claimed is:

1. A display management system, comprising:
   a base configured to be placed underneath a computer;
   a neck projecting from the base;
   a top bracket extending from the neck;
   a display connector disposed along the top bracket, the display connector configured to couple with a display feature;
   a laptop computer positioned between the base and the ton bracket a receiving area defined by the neck and a flat panel display screen coupled to the display feature, wherein the receiving area is configured to receive a display screen of the laptop computer.

2. The system of claim 1, wherein the display feature includes a display arm and a flat panel display.

3. The system of claim 1, comprising a cable clip disposed along the top bracket, wherein the cable clip is configured to guide cables from the display feature.

4. The system of claim 1, wherein the neck is integral with the base.

5. The system of claim 1, wherein the top bracket is integral with the neck and the base.

6. The system of claim 1, wherein the top bracket comprises a vertical projection that is configured to adjustably couple with the neck to facilitate adjusting relative positions of the base and the bracket to receive computers of different sizes.

7. The system of claim 6, comprising a fastener configured to hold the top bracket and the base in relative positions when tightened about the vertical projection and the neck.

8. The system of claim 1, comprising an adjustable display arm coupled to the display connector, wherein the adjustable display arm is configured to hold a flat panel display in position above or to a side of an integral display of the laptop computer.

9. The system of claim 1, comprising a security device configured to resist unauthorized access to the computer by biasing the computer between the base and the top bracket and locking to a work surface.

10. The system of claim 1, wherein the base is configured to support the display feature without coupling to a work surface.

11. The system of claim 1, wherein the base is configured to utilize coupling with the computer as an underpinning to support the display feature.

12. The system of claim 1, wherein the neck projects from the base in a substantially perpendicular orientation to the base and the top bracket extends from the neck in a substantially parallel orientation to the base.

13. The system of claim 1, wherein the display connector is configured to hold a display in a cantilevered position such that the display is closer to a user than the keyboard.

14. A display management method, comprising:
   receiving a computer on a base;
   slidably adjusting a top bracket along a neck extending from the base such that the top bracket is disposed along a top portion of the computer;
   coupling to a display feature utilizing a display connector disposed along the top bracket;
   a computer positioned between the base and the top bracket a receiving area defined by the neck and a flat panel display screen coupled to the display feature, wherein the receiving area is configured to receive a display screen of the computer.

15. The method of claim 14, comprising supporting the display feature by utilizing the computer as an underpinning.

16. The method of claim 14, comprising guiding cables from the display feature along a path with a cable clip.

17. The method of claim 14, comprising holding the base and the top bracket in respective positions with a fastener tightened about the neck and the top bracket.

18. The method of claim 14, comprising holding a flat panel display in position above or to a side of an integral display of the computer with a display arm coupled to the display connector.

19. The method of claim 14, comprising supporting the display feature without coupling to a work surface.

20. A system comprising:
   a base configured to be placed underneath a computer;
   a display arm coupled to the base at a first connector, wherein the display arm is cantilevered from the first connector to a second connector configured to support a display, the base comprises a weight receiving area between the first and second connectors, and the weight receiving area is configured to receive an object to add weight to the base to counteract weight of the display; and
   a security device configured to resist unauthorized access to the computer by biasing the computer between the base and a ton bracket located on a ton side of the computer for locking the computer to a work surface.

21. The system of claim 20, wherein the weight receiving area comprises a computer receptacle.

* * * * *

UNITED STATES PATENT AND TRADEMARK OFFICE
CERTIFICATE OF CORRECTION

PATENT NO. : 7,593,219 B2  Page 1 of 1
APPLICATION NO. : 11/789988
DATED : September 22, 2009
INVENTOR(S) : David Quijano et al.

It is certified that error appears in the above-identified patent and that said Letters Patent is hereby corrected as shown below:

In column 6, line 58, in Claim 1, delete "ton" and insert -- top --, therefor.

In column 8, line 34, in Claim 20, before "bracket" delete "ton" and insert -- top --, therefor.

In column 8, line 34, in Claim 20, before "side" delete "ton" and insert -- top --, therefor.

Signed and Sealed this

Ninth Day of November, 2010

David J. Kappos
*Director of the United States Patent and Trademark Office*